(12) United States Patent  
Davis

(10) Patent No.: US 8,035,519 B2  
(45) Date of Patent: Oct. 11, 2011

(54) OFFICE COMMUNICATION SYSTEM

(76) Inventor: Andrew P. Davis, Bellevue, WA (US)

( * ) Notice: Subject to any disclaimer, the term of this patent is extended or adjusted under 35 U.S.C. 154(b) by 0 days.

(21) Appl. No.: 12/784,769

(22) Filed: May 21, 2010

(65) Prior Publication Data

US 2010/0240305 A1 Sep. 23, 2010

Related U.S. Application Data

(63) Continuation of application No. 11/777,788, filed on Jul. 13, 2007.

(60) Provisional application No. 60/831,394, filed on Jul. 15, 2006.

(51) Int. Cl.
```
G08B 13/14      (2006.01)
G08B 9/00       (2006.01)
G08B 25/00      (2006.01)
H04M 11/04      (2006.01)
H04L 12/50      (2006.01)
```

(52) U.S. Cl. ................. 340/572.1; 340/539.13; 340/6.1; 340/286.02; 455/404.1; 455/404.2; 370/388

(58) Field of Classification Search ........................ None  
See application file for complete search history.

(56) References Cited

U.S. PATENT DOCUMENTS

| | | | |
|---|---|---|---|
| 3,662,267 | A | 5/1972 | Reed |
| 5,564,070 | A | 10/1996 | Want et al. |
| 5,917,425 | A | 6/1999 | Crimmins et al. |
| 7,057,512 | B2 | 6/2006 | Stilp |
| 7,295,119 | B2 | 11/2007 | Rappaport et al. |
| 2006/0023681 | A1 | 2/2006 | A'Rafat |
| 2006/0109811 | A1 | 5/2006 | Schotten et al. |
| 2007/0229252 | A1 | 10/2007 | Collins et al. |
| 2007/0279219 | A1 | 12/2007 | Warriner |
| 2008/0014868 | A1 | 1/2008 | Davis |
| 2009/0137256 | A1 | 5/2009 | Karaoguz |
| 2009/0138353 | A1 | 5/2009 | Mendelson |

*Primary Examiner* — Julie Lieu  
(74) *Attorney, Agent, or Firm* — Lowe Graham Jones PLLC

(57) ABSTRACT

An office communication system provides intra-office communication within a medical or dental office, for example. The system includes a door or wall unit, a table or desk unit, and a wearable or portable unit. The door and desk units are configured to transmit and receive both infrared and radio frequency type wireless signals. The portable unit may include an infrared light transmitter configured to transmit infrared light encoded with a unique address or identifier. The system operates to non-obtrusively notify office personnel whether a practitioner has entered or is presently within a particular exam room of the office, even if a door of the exam room is closed.

21 Claims, 6 Drawing Sheets

OFFICE COMMUNICATION SYSTEM

PRIORITY CLAIM

This application is a continuation of U.S. Utility application Ser. No. 11/777,788 filed Jul. 13, 2007, entitled Office Communication System which claims the benefit of U.S. Provisional Application Ser. No. 60/831,394 filed Jul. 15, 2006 and entitled Remote Control Office Communication System, the contents of which are incorporated herein.

FIELD OF THE INVENTION

This invention relates generally to an office communication system having a number of units that are spatially separated and in communication with one another such that information may be exchanged between or among the units.

BACKGROUND OF THE INVENTION

A medical office setting relies on unobtrusive methods to communicate information regarding office personnel needs and whereabouts, front desk needs and patient flow information. For example, the front desk or other office personnel may need to determine whether a particular doctor is in a particular exam room. Frequently, there are multiple examination rooms as well as multiple doctors, which can pose a challenge to continually monitor and track the whereabouts of various office personnel.

By way of example, a technician may need to notify a particular doctor that his or her patient has been placed in a certain exam room and is ready to be seen. Frequently, a doctor in a room with a patient needs to alert a medical technician outside of the room that assistance is needed in the room.

One commonly used, low-tech approach to solving the aforementioned problems includes a system of colored flags that are rotated into view and visible down a hallway of the office. Different colored flags can be manually rotated into view to signal various needs.

Intercom systems are also available to communicate between various locations in the office setting, but such systems often require hard wiring. In addition, intercom systems must be used with caution when patients are present due to privacy issues and the Health Insurance Portability and Accountability Act of 1996, commonly referred to as HIPAA.

Traditionally pagers have been used in medical settings, but pagers are more appropriate in a hospital based setting to call a doctor for a particular need or emergency and are impractical in smaller office environment such as a medical clinic or dental office.

SUMMARY OF THE INVENTION

In one embodiment, an office communication system provides intra-office communication, for example, within a medical or dental office. The system includes a door or wall unit, a table or desk unit and a wearable or portable unit. The door and desk units may be configured to transmit and receive optical, radio frequency, and other types of data or information carrying signals that are preferable sent and received wirelessly, but may be sent and received via other methods. For example, the door and desk units may be configured to send and receive infrared light signal encoded with a unique address or identifier. The portable unit may also include a transceiver configured to transmit and receive optical, radio frequency, and other types of data or information carrying signals. In an alternative embodiment, for example in order to conserve power, the portable unit may be substantially dormant until such time as it receives a low level radio frequency communication signal, such as from a radio frequency identification (RFID) device

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
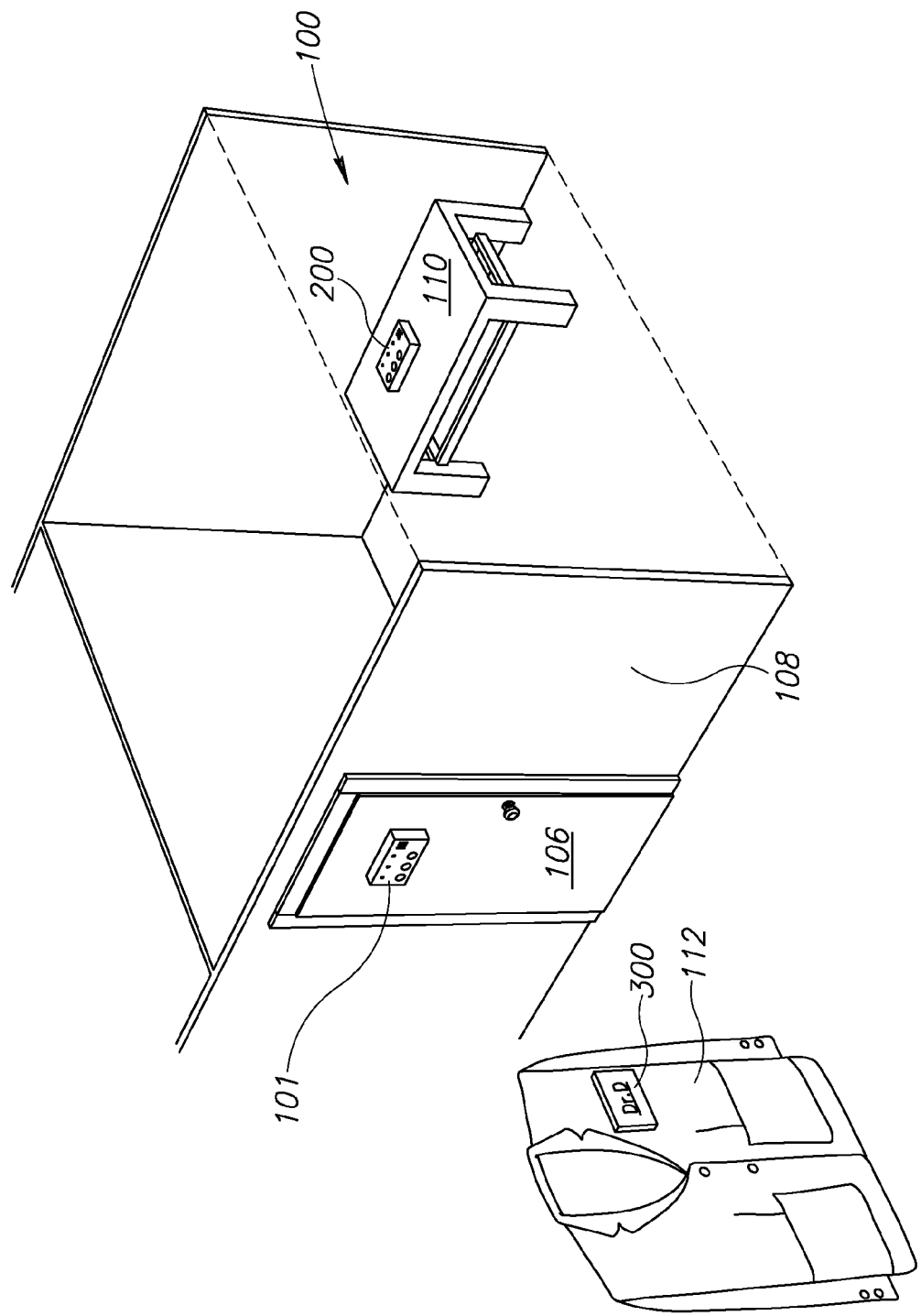
FIG. 1 is a schematic view of an office environment utilizing an office communication system in accordance with an embodiment of the present invention.

FIG. 1 shows an office environment 100 having a first unit 101, a second unit 200, and a portable unit 300 according to an illustrated embodiment of the invention. The office environment 100 may be a medical office, dental office, or a similar office where patients or clients are seated in various rooms to be seen by at least one of the office personnel, for example a nurse, a doctor, a dentist, or a hygienist. In a preferred embodiment, the first unit 101 is mounted on a substantially vertical surface 106 such as an exterior surface of a door or wall of an examination room 108 such that the first unit 101 may be visible to those outside of the examination room 108 when the door 106 is closed. Likewise, the second unit 200 is positioned on a substantially horizontal surface 110 such as a desk or counter located in the examination room 108 and may be visible from within the examination room 108. Alternatively, the first unit 101 and the second unit 200 may be mounted or supported on a variety of surfaces being horizontal, vertical, or having other slopes, and thus are not limited to being mounted or supported on the above-described vertical and horizontal surfaces. The portable unit 300 is attachable to an apparel item 112 such as a coat or scrubs typically worn by medical or dental office personnel. Preferably, the portable unit 300 is attached to the apparel item 112 so that it is visible to other personnel in the office environment 100.

Figure 2:
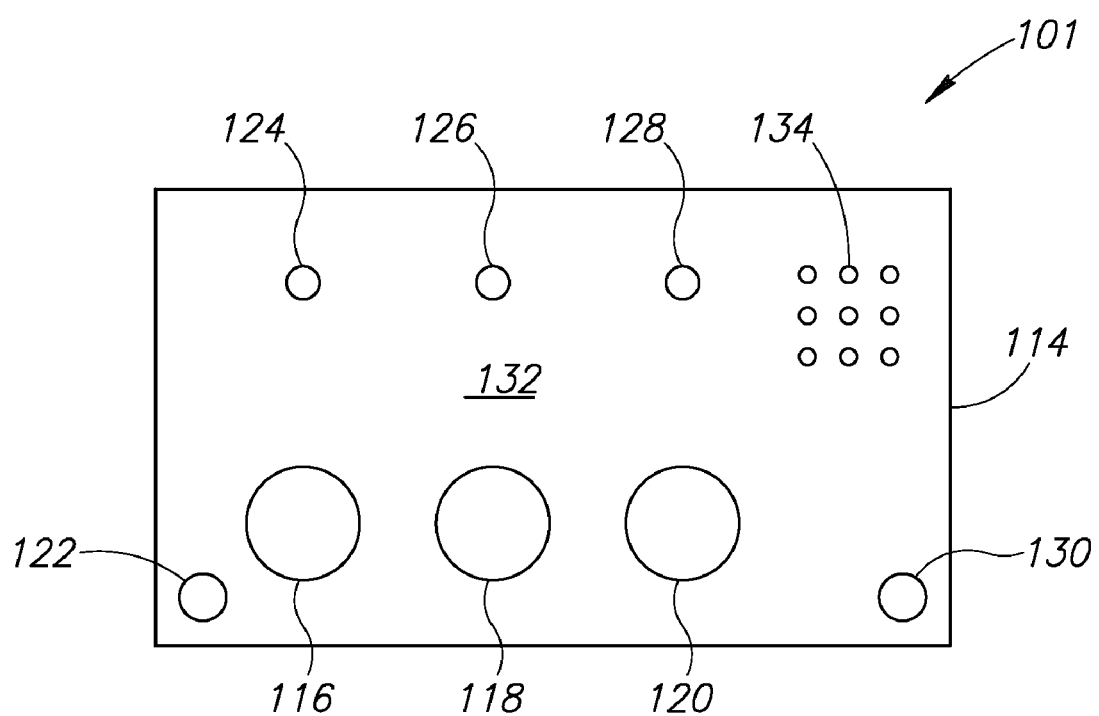
FIG. 2 is a top plan view of a first communication unit mountable on a vertical surface in accordance with an embodiment of the present invention.

FIG. 2 shows a schematic view of an external, viewable configuration of the first unit 101 (e.g., door unit) according to an embodiment of the invention. The door unit 101 includes a housing 114 having switches 116, 118, and 120, an audible sensory device 122, optical sensory devices 124, 126, and 128, and a receiving element 130 for receiving a wireless signal (not shown). The door unit 101 may have a number of purposes such as, but not limited to, helping office personnel schedule and prioritize the occupancy of various exam rooms 108 (FIG. 1), providing a notification that someone in the exam room 108 needs assistance, for example a doctor may need a particular medical instrument or indicating that the exam room needs to be cleaned, and for indicating specifically whether a particular individual, such as a particular doctor or dentist, is inside the exam room 108. In one embodiment, the first and second units 101 and 200, the door and desk units, respectively, may not be identical in appearance, structural configuration, purpose, or function. For example, the room unit 200 may not include any type of visible indicator to designate who is in the room and may not be battery powered. It is appreciated and discussed below, however, that the room unit 200 would be configured to provide information about who was in the room to another desk or room unit located in a remote part of the office or at least located outside of the particular room.

The switches 116, 118, and 120 may be touch sensitive switches that are manually activated and cooperate with optical sensory devices 124, 126, and 128. In the illustrated embodiment, the switches 116, 118, and 120 are located on a front surface 132 of the housing 114 below and approximately aligned with corresponding optical sensory devices 124, 126, and 128. In one embodiment, the optical sensory devices 124, 126, and 128 are light emitting diodes (LEDs) and the audible sensory device 122 may be a piezoelectric beeper (not shown) for emitting an audible sound. It is appreciated that the number and arrangement of the switches and sensory devices may vary depending on different office configurations and office communication needs.

In one embodiment, the receiving element 130 operates as a light transmissive lens or filter for receiving a predetermined type of light, such as infrared light from an infrared LED source. Alternatively, the receiving element 130 may be configured as radio reception device capable of receiving a predetermined radio frequency (RF), which may include but is not limited a low frequency radio signal generally in a range of about 30 KHz to 500 KHz, a high frequency radio signal generally in a range of about 850 MHz to 950 MHz and 2.4 GHz to 2.5 GHz, or substantially any other radio frequency or rate in an overall range of about 3 Hz to 30 GHz. In an alternative embodiment, the light array 134 includes an array of different colored LEDs in which each color corresponds to an individual working in the office environment 100 (FIG. 1). For example, the LED array 134 may have separate and discretely colored LEDs that represent each doctor or dentist working in the office environment 100 (FIG. 1). Accordingly and by way of example, a blue LED within the LED array 134 will light up when a Dr. Doe enters the exam room 108 (FIG. 1) and will remain lit while the doctor remains in the exam room 108.

Figure 3:
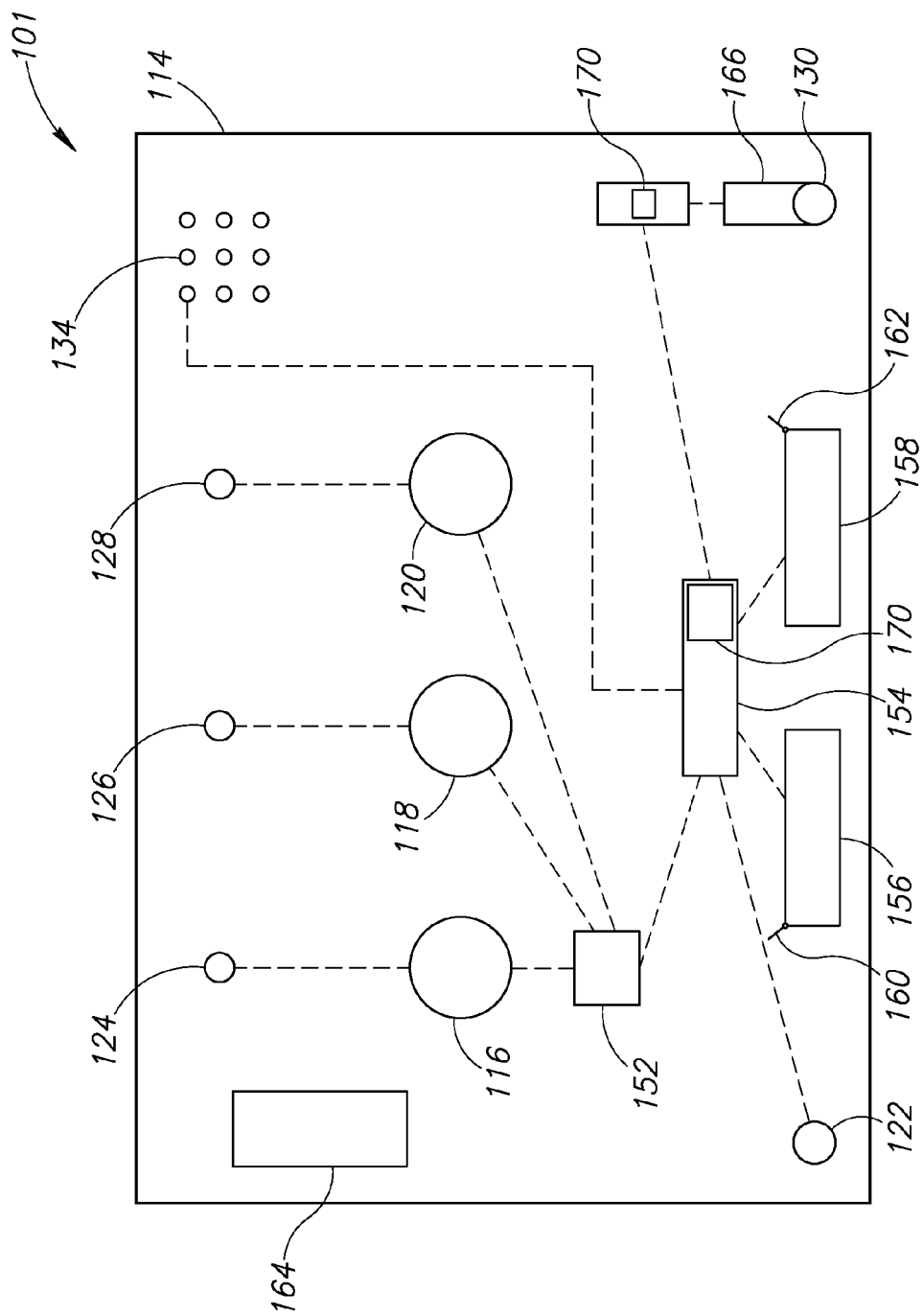
FIG. 3 is a schematic diagram of a number of inter-related components within the first communication unit of FIG. 2 in accordance with an embodiment of the present invention.

FIG. 3 shows a schematic view of the working components located within the housing 114 of the door unit 101. In one example of the present invention, switches 116, 118, and 120 are electronically connected to a circuit 152, which in turn communicates with a microprocessor 154. The microprocessor 154 is operably connected to a radio frequency transmitting module 156, LED lights 124, 126, and 128, the LED array 134, the audible sensory device 122, and a radio frequency (RF) receiving module 158. In one embodiment, the transmitting module 156 and the receiving module 158 are combined to take the form of a transceiver that operates to both send and receive signals. A transmission antenna 160 is connected to the RF transmitting module 156 and a reception antenna 162 is connected to the RF receiving module 158. A power supply source 164, such as a battery, supplies power to the at least some of the working components within the first unit 101.

In addition, the microprocessor 154 is operably connected to an infrared receiver module 166 located behind the receiving element 130 (FIG. 2) for receiving and processing infrared light. In one embodiment, the receiver module 166 communicates with an intermediate microprocessor 168. In addition, the microprocessor 154 and the intermediate microprocessor 168 may include timing devices 170.

Figure 4:
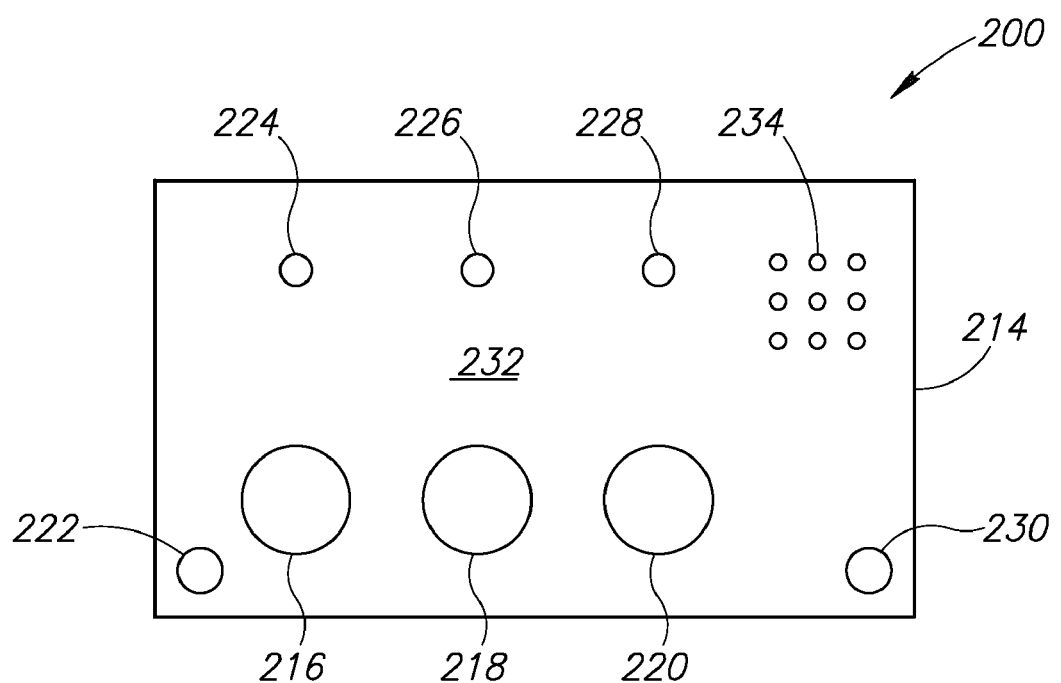
FIG. 4 is a top plan view of a second communication unit mountable on a horizontal surface in accordance with an embodiment of the present invention.

FIG. 4 shows a schematic view of an external, viewable configuration of the second unit 200 (e.g., desk unit) according to an embodiment of the invention. For purposes of this description, the configuration of the desk unit 200 is sufficiently identical to the configuration of the door unit 101 described above. One difference between the door unit 101 and the desk unit 200 is how or where the unit is located within the office environment 100 (FIG. 1). For example, the door unit 101 may be mounted outside of the exam room 108 on a substantially vertical surface, whereas the desk unit 200 may be supported on a substantially horizontal surface such as a table, desk, or countertop within the office environment 100 (FIG. 1).

The desk unit 200 includes a housing 214 having switches 216, 218, and 220, an audible sensory device 222, optical sensory devices 224, 226, and 228, and a receiving element 230 for receiving a wireless signal (not shown). The desk unit 200 may have a number of purposes such as, but not limited to, helping office personnel schedule and prioritize the occupancy of various exam rooms 108 (FIG. 1), providing a non-obtrusive means to request assistance within the exam room 108 without opening the door 106 (FIG. 1) of the exam room 108. By way of example, the desk unit 200 may provide an indication that a certain task, activity, or function is required to be performed in the exam room 108. For example, the desk unit 200 may have color-coded LED that indicates to a person entering the room 108 that the room needs to be refreshed before the next patient arrives. It is appreciated that a variety of other tasks, activities, or functions may be coded on the desk unit 200 depending on the needs of the particular office environment.

The switches 216, 218, and 220 may be touch sensitive switches that are manually activated and cooperate with optical sensory devices 224, 226, and 228. In the illustrated embodiment, the switches 216, 218, and 220 are located on a front surface 232 of the housing 214 below and approximately aligned with corresponding optical sensory devices 224, 226, and 228. In one embodiment, the optical sensory devices 224, 226, and 228 are light emitting diodes (LEDs) and the audible sensory device 222 is a piezoelectric beeper 240 for emitting an audible sound. It is appreciated that the number and arrangement of the switches and sensory devices may vary depending on different office configurations and office communication needs.

In one embodiment, the receiving element 230 operates as a light transmissive lens or filter for receiving a predetermined type of light, such as infrared light from an infrared LED source. Alternatively, the receiving element 230 may be configured as sound reception device capable of receiving a predetermined sound within a desired frequency range. Preferably, the desired frequency range is outside of an audible range (i.e., not detectable by a human ear). The receiving element 230 may cooperate with a light array 234.

In one embodiment, the light array 234 includes an array of different colored LEDs in which each color corresponds to an individual working in the office environment 100 (FIG. 1). For example, the LED array 234 may have separate and discretely colored LEDs that represent each doctor or dentist working in the office environment 100 (FIG. 1).

Figure 5:
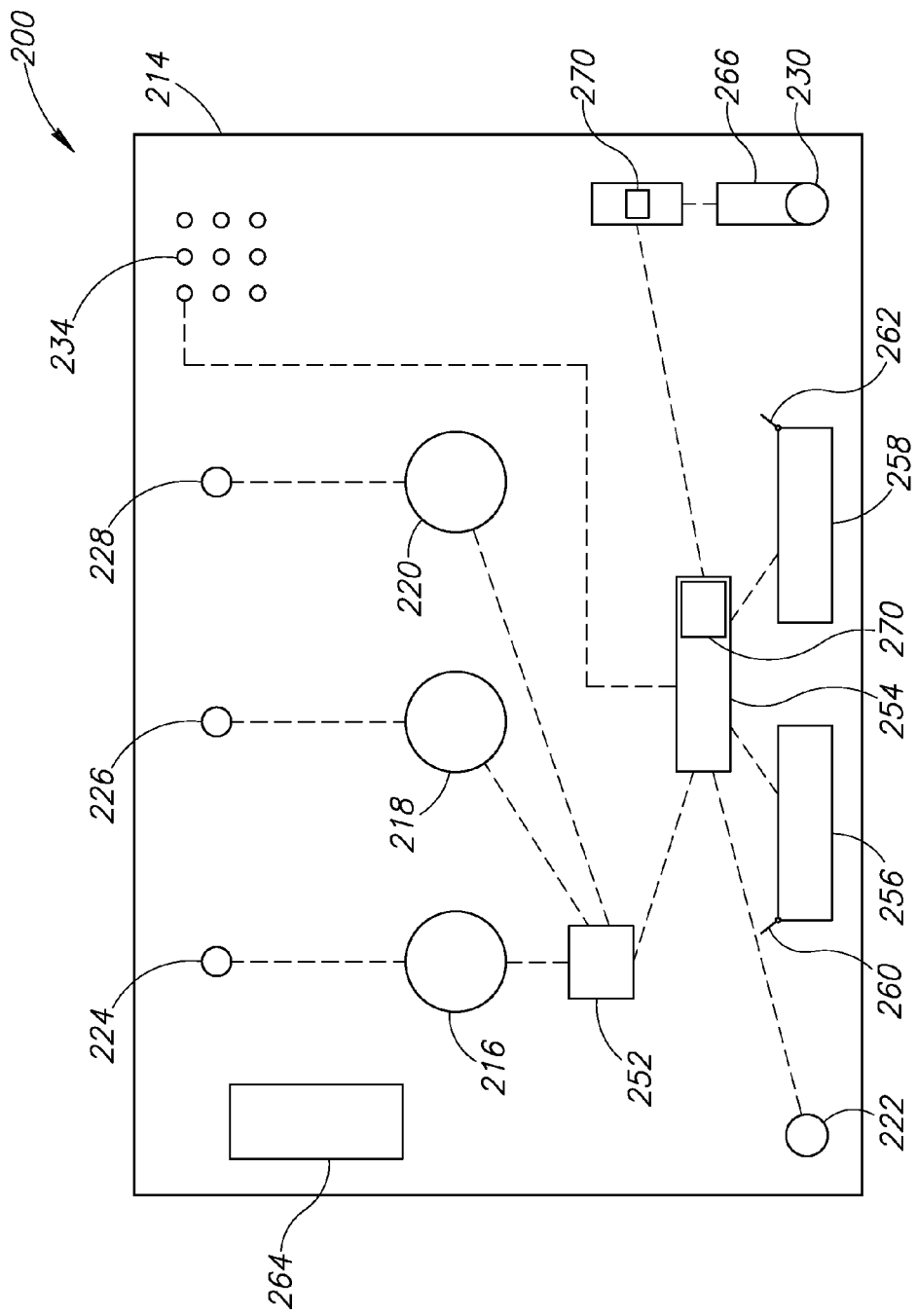
FIG. 5 is a schematic diagram of a number of inter-related components within the second communication unit of FIG. 4 in accordance with an embodiment of the present invention.

FIG. 5 shows a schematic view of the working components located within the housing 214 of the second or desk unit 200. In one example of the present invention, switches 216, 218, and 220 are electronically connected to a circuit 252, which in turn communicates with a microprocessor 254. The microprocessor 254 is operably connected to a radio frequency (RF) transmitting module 256, LED lights 224, 226, and 228, the LED array 234, the audible sensory device 222, and a radio frequency (RF) receiving module 258. In one embodiment, the transmitting module 256 and the receiving module 258 are combined to take the form of a transceiver that operates to both send and receive signals. A transmission antenna 260 is connected to the RF transmitting module 256 and a reception antenna 262 is connected to the RF receiving module 258. A power supply source 264, such as a battery, supplies power to the at least some of the working components within the desk unit 200. One purpose of the desk unit 200 is to transmit a signal to a remote portion of the office carrying information about who is in the room at a particular time. In view of this, the desk unit 200 does not necessarily require any visible indicators on the desk unit 200. If a visible indicator is provided, the indicator may take the form of a single LED with the capability to change colors depending on who is in the room or depending on whether a certain task, activity, or function is required in the room or the indicator may take the form of a panel of LEDs where each individual LED represents discrete and independent information. Further, the visible indicator may take a non-optical form, such as providing a particular sound or beep.

In addition, the microprocessor 254 is operably connected to an infrared receiver module 266 located behind the receiving element 230 (FIG. 4) for receiving and processing infrared light. In one embodiment, the receiver module 266 communicates with an intermediate microprocessor 268. In addition, the microprocessor 254 and the intermediate microprocessor 268 may include timing devices 270. The timing device 270 may operate to automatically trigger the microprocessor 268 either ON or OFF so that it is not constantly in an "ON" state.

Figure 6:
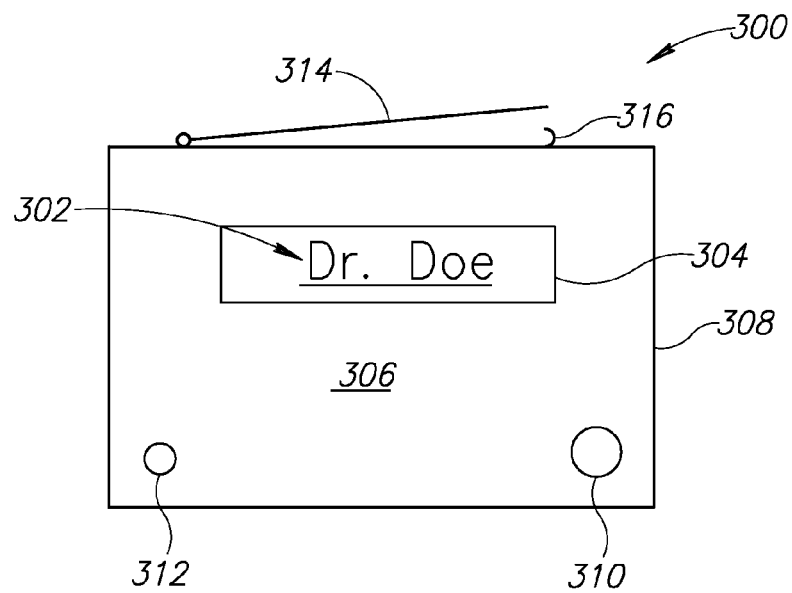
FIG. 6 is a top plan view of a portable communication unit attachable to an item of apparel of an office personnel in accordance with an embodiment of the present invention.

FIG. 6 shows the portable unit 300, which may operate as a name tag and as a wireless office management device. One purpose of the portable unit 300 is to provide a means for office personnel to locate a particular individual within the office environment 100 (FIG. 1). Preferably, the portable unit 300 includes a name 302 within a bordered region 304 located on a front surface 306 of a housing 308 of the portable unit 300. The portable unit 300 further includes a transmitter lens 310 through which light or another type of wireless signal is transmitted to the first unit 101, the second unit 200, or both. In one embodiment, the transmitter lens 310 includes an optical filter for transmitting only infrared light. As will be explained in greater detail below, the transmitter lens 310 cooperates with the receiving elements 130, 230 of the first and second units 101, 200, respectively.

In addition, an audible sensory device 312 is coupled to the portable unit 300 for emitting an audible sound, for example a beeping sound. In one embodiment, the audible sensory device 312 is a piezoelectric beeper. A pin 314 with a corresponding hook 316, or other equivalent mechanical attachment means, is coupled to the housing 308 and may be manipulated to attach the portable unit 300 to an item of apparel such as a doctor's coat or a medical scrub shirt 112 (FIG. 1).

Figure 7:
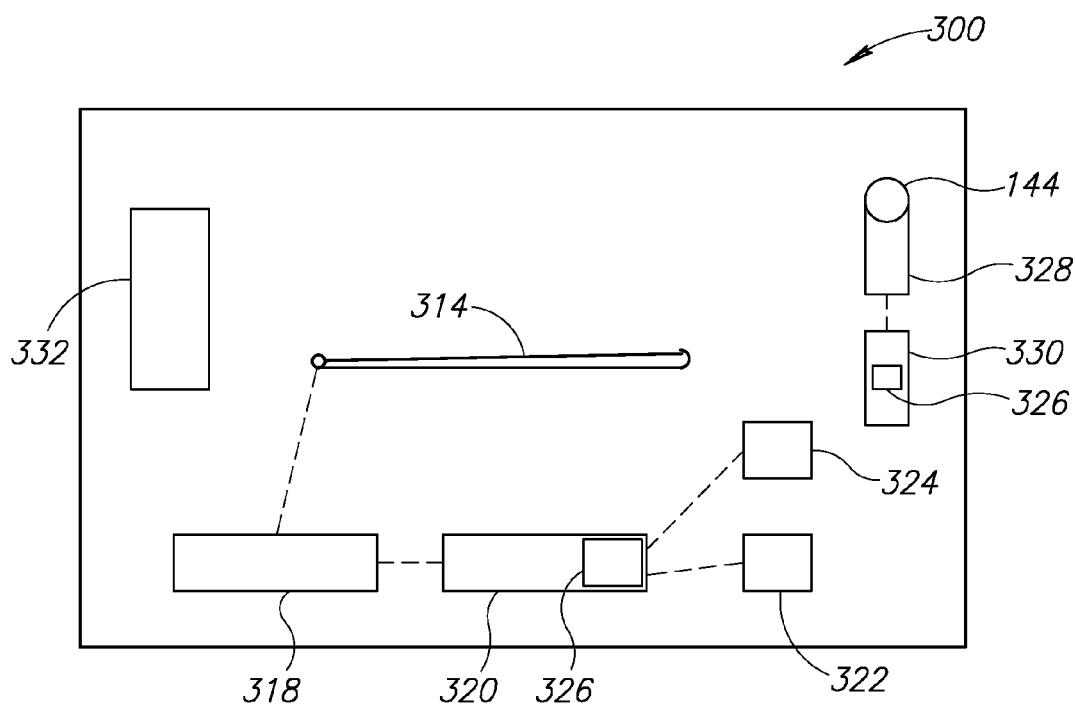
FIG. 7 is a schematic diagram of a number of inter-related components within the portable communication unit of FIG. 6 in accordance with an embodiment of the present invention.

FIG. 7 shows a schematic view of the working components of the portable unit 300. Continuing the above-described example of the present invention, an RF receiving module 318 is connected to a microprocessor 320 which connects to a small vibrator motor 322 and a piezoelectric beeper 324. The microprocessor 320 further includes a timing device 326. The pin 148 functions as an antenna for the RF receiving module 172 in the illustrated embodiment. The antenna, however, may take other forms and may be located on other portions of the portable unit 300. The transmitter lens 144 receives infrared light from an infrared transmitting module 328, which may be coupled to an intermediate microprocessor 330 and may include another timing device 326. A power supply source 332, such as a battery, supplies power to the at least some of the working components within the portable unit 300. In another embodiment, the receiving module 318 receives an infrared signal and the transmitting module 328 transmits an RF signal. Alternatively, the receiving module 318 and the transmitting module 328 may be configured to receive and transmit, respectively, other types of data or information carrying signals.

In one embodiment, the portable unit 300 is configured to be a passive RF unit. By way of example, the portable unit 300 may operate without a separate external power source and instead obtain operating power from the door unit 101, the desk unit 200, some other remote power source, or a combination of the above. Some possible advantages of a passive unit are a lower weight, less expensive, and a longer operational lifetime.

The timing devices 170 (FIG. 3), 270 (FIG. 5), and 326 (FIG. 5) conserve power by allowing the respective microprocessors, transmitters and receivers to pulse on and off in a coordinated way. In one embodiment, the timing devices 170, 270 and 326 are configured to switch the respective units 101, 200, and 300 from a sleep mode to an active mode, or vice-versa. Consequently, the timing devices 170, 270 and 326 may operate to reduce the overall power consumption and prolong battery life, which is likely more important for the portable unit 300 because the portable units 300 will likely be worn by office personnel throughout an entire workday.

Referring to FIGS. 1-7 described above and using an office environment of a family practice medical clinic as an example, the general operation and intra-office communication of the door unit 101 and the desk unit 200 will now be described. If the doctor, nurse, or other person in the examination room 108 needs assistance, they may press or otherwise activate a desired switch 216, 218, or 220 of the desk unit 200 to communicate with the microprocessor 254. For example, activating the switch 216 signals the microprocessor 254 to briefly turn on the corresponding LED 224 and may further signal the RF transmitting module 256 to open radio frequency communication on a desired channel with the door unit 101.

The door unit 101 receives the radio signal from the desk unit 200 via the RF receiving module 158, which communicates with the microprocessor 154 of the door unit 101 to illuminate the LED 124 and may briefly activate or sound the audible sensory device 122 of door unit 101. The LED 124 of the door unit 101 stays lit until one of the office personnel outside of the exam room 108 touches the switch 116 of the door unit 101 to turn off LED 124. In one embodiment the office personnel outside of the exam room 108 may be alerted by the audible sensory device 122, and can look up to see which room has the LED lit. Similarly, personnel outside of the exam room may touch switch 118 of the door unit 101 to sound beeper 222 and LED 224 of the desk unit 200. The doctor or other person in the room would then be prompted to turn off the LED 224 of the desk unit 200 by touching the switch 220 of the desk unit 200. Thus, a type of wireless 3-way switch is created between the door unit 101 and the desk unit 200. The electronics can be designed so that LEDs stay on via a brief RF signal with the microprocessor providing an ON and OFF toggling function. In addition, the door unit 101 and the desk unit 200 may operate on a three-way switch meaning that same button is not required to turn features on the respective units either ON or OFF. For example, the LED 224 of the desk unit 200 may be turned ON or OFF remotely, by personnel using another desk unit 200 in a front office area.

If the officer personnel want to communicate that a particular exam room 108 is next to be seen by the doctor, the switch 116 of the door unit 101 may be touched, which signals the touch-sensitive circuit 152 and the microprocessor 154 and turns on the LED 124. If the office personnel wish to turn off the LED 124, the switch 116 is simply touched again. Similarly, the doctor may active the switch 218 on the desk unit 200 to signal a particular need, such as the assistance of one of the office personnel to obtain or clean a medical instrument.

Various embodiments of this invention can consist of multiple door and desk units, each with multiple rows of touch sensitive switches and LEDs. Each switch of each box with a remote control function can have a unique RF signal or channel. Alternatively, some switches can have a common channel, thus allowing the front desk to signal all rooms with one button. Additionally, other embodiments may allow an individual switch to be selected to act either as an individual on/off switches or as paired remote switches.

In one embodiment, a front desk unit 200 includes a central panel having and LED array showing various activities in the multiple rooms of the office environment, for example indicating which doctor is in which room at any given time. The central panel permits the front office personnel to schedule and prioritize aspects of the office by having real time information about what is happening in a selected room. The LED array may take the form of a map or a layout of the office environment with each room having at least one LED indicator associated therewith.

The operation of the portable unit 300 will now be described. There may be times where the doctor needs to signal the assistant for help when the location of the assistant is not known. Or similarly, for the assistant or front desk to alert the doctor when his whereabouts in the office are not known. The doctor, needing to call the assistant for help, presses the touch switch 220 on desk unit 200, which activates the circuit 252 of the desk unit 200, which then triggers the microprocessor 254 to briefly light LED 224. In addition, the microprocessor 254 controls the RF transmitting module 256 of desk unit 200 for communicates on a unique channel with RF receiving module 328 of the portable unit 300, which signals the microprocessor 330 to briefly activate the vibrator motor 322 and beeper 324 of the portable unit 300. Each portable unit 300 may have a unique RF communication address, which permits the signaling of a specific person. In addition or alternatively, each portable unit 300 may have a common address, which permits at least a majority of the office personnel to be alerted. Other embodiments of the portable unit 300 may allow for switching between a common address and a unique address to increase the versatility of the overall system. In another embodiment, each portable unit 300 may have separate and discrete beeper tones to designate specific signals.

In one embodiment, the infrared transmitting module 328 of the portable unit 300 transmits a unique signal at a particular interval determined by the timing device 326 in communication with the intermediate microprocessor 330. When the doctor wearing the portable unit 300 enters the examination room 108, the receiving element 230 of the desk unit 200 receives the infrared light from the portable unit 300. Then, the desk unit 200, using the RF transmitting module 256, signals the RF receiving module 156 of the door unit 101 to activate the microprocessor 154 of the door unit 101 to controllably turn on one of the LEDs in the LED array 134 of the door unit 101. The particular LED which is lit may be associated with unique address corresponding to the infrared transmitting module 328 of portable unit 300.

Thus, no matter which room the doctor enters, the same color LED will be lit on the door unit 101 outside that particular exam room 108. At the same time the LED array 134 is signaled on the door unit 101 when the doctor enters the exam room 108, either the door unit 101 or the desk unit 200, or both, depending on the embodiment, may communicate with the other regarding the status of the doctor and provide instructions to turn on or off the LED However, the above-identified LED of the LED array 134 on the door unit 101 will remain lit until the doctor exits the exam room 108. At that point, the infrared receiving module 266 of the desk unit 200 no longer receives the infrared signal from portable unit 300. Once the desk unit 200 has failed to receive any infrared light from the portable unit 300 for a predetermined amount of time, the desk unit 200 signals the microprocessor 154 of the door unit 101 to turn off the individual LED of LED array 134.

In yet another example of the operation of the system, one of the office personnel signals which room the doctor will be entering next by touching the switch 116 on the door unit 101, which turns on one of the LEDs 124, 126, or 128. When the doctor enters that room the lit LED 124, 126, or 128 automatically turns off, and the LED light unique to that doctor within the LED array 134 is turned on. When the doctor leaves the room, the unique LED light on the LED array 134 of the door unit 101 is automatically turned off. Consequently, anyone in proximity to a particular door unit 101 may be able to determine which doctor is in which room looking at which color LED within the LED array 134 happens to be lit.

In yet another embodiment, the door unit 101 works directly with the portable unit 300 without any intermediate communication with the desk unit 200. Other embodiments may include radio frequency identification technology having a directional capability, rather than infrared sensing modules. Further, the wireless signals may be transmitted and received using short range radio frequency technology, blue tooth type technology, or an equivalent technology. Moreover, many different variations of LED colors, flashing LEDs, bi-color or tri-color LEDs, LED array configurations or layouts, different sounds or different types of beepers, may be included in the above-described embodiments. Additionally, the portable unit 300 may include a belt clip (not shown) so that it may be worn similar to a pager.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An office communication system for an office comprising:
   a wearable communication unit, the wearable communication unit comprising:

a wireless transceiver in cooperation with a microprocessor operable to send a wireless signal encoding a unique identifier associated with the wearable communication unit; and a sensory output device in communication with the microprocessor to provide a user detectable output in response to a wireless signal received at the transceiver;

a first communication unit having a wireless transceiver in cooperation with a microprocessor operable to receive the wireless signal from the wearable communication unit such that when a particular wearable communication unit is within a predetermined vicinity from the first communication unit, the first communication unit is configured to transmit a wireless signal indicative of the particular wearable communication unit being located within the predetermined vicinity; and a second communication unit having a receiving module to receive the wireless signal from the first communication unit, the receiving module electronically coupled to an indicator detectable by a human sensory system, wherein upon receipt of the wireless signal a microprocessor in the second communication unit activates the indicator to notify others that the particular wearable communication unit is located within the predetermined vicinity.

2. A method of communicating information within an office, the method comprising:

transmitting a first wireless signal from a wearable communication unit, the first wireless signal comprising information indicating proximity of the wearable communication unit to a first communication unit positioned within a particular region of the office and a unique identifier associated with the particular wearable communication unit;

receiving the first wireless signal at the first communication unit;

transmitting a second wireless signal from the first communication unit, the second wireless signal indicative of the particular wearable communication unit being located within the particular region of the office associated with the first communication unit when a microprocessor of the first communication unit determines if the wearable communication unit is within a predetermined vicinity from the first communication unit based on the received proximity information;

receiving the second wireless signal at a second communication unit;

activating an indicator coupled to the second communication unit to notify office personnel outside of the particular region of the office that the wearable communication unit is located within the particular region of the office associated with the first communication unit;

transmitting a third wireless signal from the first or second communication units to the wearable communication unit; and providing a user detectable output at the wearable communication unit in response to the third wireless signal.

3. The method of claim 2 wherein transmitting the first wireless signal from the wearable communication unit includes transmitting a wireless signal from an infrared light source.

4. The method of claim 2 wherein transmitting the second wireless signal from the first communication unit includes transmitting a radio frequency.

5. The method of claim 2 wherein activating the indicator coupled to the second communication unit includes energizing a light emitting diode.

6. An office communication system for use in an office having a plurality of examination rooms, the office comprising:

a first communication unit associated with at least one of the plurality of examination rooms, the first communication unit comprising:
a wireless transceiver; and
a microprocessor in signal communication with the wireless transceiver;

a second communication unit located at a monitoring station of the office, the second communication unit comprising:
a receiving module configured to receive the wireless signal from the first communication unit;
an indicator; and
a microprocessor in signal communication with the receiving module and the indicator; and a wearable communication unit comprising a housing configured to be attachable to a clothing item of a person associated with the business operating in the office, the housing comprising a wireless transceiver configured to receive a wireless signal from the first communication unit;

wherein the first communication unit receives a wireless signal from the wearable communication unit, the wireless signal comprises information indicating proximity to the first communication unit and identification information of the user of the wearable communication unit, the first communication unit transmits a wireless signal indicative of the wearable communication unit being located within one of the plurality of examination rooms associated with the first communication unit when the microprocessor determines if the wearable communication unit is within a predetermined vicinity from the first communication unit based on the received proximity information, wherein when the second communication unit receives the wireless signal transmitted by the first communication unit, the microprocessor of the second communication unit activates the indicator to notify others within the office that the wearable communication unit is located within the office associated with the first communication unit.

7. The system of claim 6, wherein the wireless transceiver of the wearable communication unit includes a transmitting component and a receiving component to respectively transmit and receive a wireless signal.

8. The system of claim 7, wherein the transmitting and receiving components operate within a desired radio frequency range.

9. The system of claim 6, wherein the sensory device of the wearable communication unit includes a light emitting diode (LED) coupled to the housing and wherein the LED is visible to the human sensory system.

10. The system of claim 6, wherein the wearable communication unit further comprises a motor unit having a vibration mechanism for providing a vibratory output signal detectable by the human sensory system.

11. The system of claim 6, wherein the sensory device of the wearable communication unit includes a mechanism for providing an audible output signal.

12. The system of claim 11 wherein the mechanism is a piezoelectric beeper.

13. The office communication system of claim 6, further comprising a sensory output device configured to provide a user detectable output in response to a wireless signal from the first communication unit.

14. The system of claim 6, further comprising a switch located on the housing of the wearable communication unit configured to be manually activated for placing the sensory device in one of a detectable or a non-detectable state.

15. The system of claim 6, wherein the wireless transceiver of the wearable communication unit is configured to receive a signal initiated by user interaction performed on one of the first or second communication units, wherein the microprocessor of the wearable communication unit is operable to receive the signal from the wearable communication unit wireless transceiver and the sensory output device is configured to output a user detectable action based on the received signal.

16. The system of claim 6 wherein the wireless signal from the wearable communication unit includes infrared light.

17. The system of claim 6 wherein the wireless signal from the first communication unit includes a radio frequency.

18. The system of claim 6 wherein the indicator is a light emitting diode.

19. The system of claim 6 wherein the predetermined vicinity includes a room within the office.

20. An office communication system for an office comprising:
   a first communication unit having a wireless transmitter in cooperation with a microprocessor operable to broadcast a wireless signal within a predetermined vicinity from the first communication unit;
   a wearable communication unit, the wearable communication unit comprising a wireless transceiver in cooperation with a microprocessor operable to receive a broadcast wireless signal from the first communication unit when the wearable communication unit is within a predetermined vicinity from the first communication unit and configured to transmit a wireless signal encoding a unique identifier associated with the wearable communication unit indicative of the particular wearable communication unit being located within the predetermined vicinity; and
   a second communication unit having a receiving module to receive the wireless signal encoding a unique identifier associated with the wearable communication unit, the receiving module electronically coupled to an indicator detectable by a human sensory system, wherein upon receipt of the wireless signal a microprocessor in the second communication unit activates the indicator to notify others that the particular wearable communication unit is located within the predetermined vicinity.

21. The office communication system of claim 20, wherein the wearable communication unit further comprises a sensory output device in communication with the microprocessor to provide a user detectable output in response to a wireless signal received at the transceiver.

* * * * *